(12) United States Patent
Huffer

(10) Patent No.: US 12,252,324 B2
(45) Date of Patent: Mar. 18, 2025

(54) VENTING SYSTEM FOR OVENABLE CONTAINERS

(71) Applicant: SONOCO DEVELOPMENT, INC., Hartsville, SC (US)

(72) Inventor: Scott William Huffer, Hartsville, SC (US)

(73) Assignee: Sonoco Development, Inc., Hartsville, SC (US)

( * ) Notice: Subject to any disclaimer, the term of this patent is extended or adjusted under 35 U.S.C. 154(b) by 0 days.

(21) Appl. No.: 18/494,271

(22) Filed: Oct. 25, 2023

(65) Prior Publication Data

US 2024/0051728 A1 Feb. 15, 2024

Related U.S. Application Data

(63) Continuation of application No. 17/682,579, filed on Feb. 28, 2022, now Pat. No. 11,834,250, which is a
(Continued)

(51) Int. Cl.
*B65D 81/34* (2006.01)
*B32B 1/00* (2006.01)
(Continued)

(52) U.S. Cl.
CPC ............ *B65D 81/3461* (2013.01); *B32B 1/00* (2013.01); *B32B 3/266* (2013.01); *B32B 7/12* (2013.01);
(Continued)

(58) Field of Classification Search
CPC ............ B65D 81/3461; B65D 77/2056; B65D 81/3453; B65D 75/5838; B65D 77/2096;
(Continued)

(56) References Cited

U.S. PATENT DOCUMENTS 3,454,210 A 7/1969 Spiegel et al.
3,716,180 A 2/1973 Bemiss
(Continued)

FOREIGN PATENT DOCUMENTS

GB 2547890 9/2017
WO WO 2018/060277 4/2018

OTHER PUBLICATIONS

Oven and Microwave Cooking Counter Bags—Sira-Cook Self-Seal—Website viewed and downloaded on Sep. 26, 2019. https://www.sirane.com/sira-cook-bags-and films/sim-cook-self-seal-oven-microwave-steam-cooking.htms. .(4 pages).
(Continued)

*Primary Examiner* — Kareen K Thomas
(74) *Attorney, Agent, or Firm* — Nelson Mullins Riley & Scarborough LLP

(57) ABSTRACT

The invention comprises an ovenable packaging structure having an integral one-way valve. The laminate structure comprises an outer layer having a cut line which defines a flap that is separable from the outer layer, wherein the outer layer is adhered to an inner layer having a cut line which is offset from the outer cut line and defines a portion that is separable from the inner layer along the inner cut line and defines an opening into the packaging structure. The adhesive between the layers comprises, in an embodiment, a channel of pressure sensitive adhesive which surrounds both the outer cut line and the inner cut line, wherein the channel of pressure sensitive adhesive defines the perimeter of at least one adhesive-free valve chamber within said channel. The valve chamber comprises at least a portion of the outer cut line and the inner cut line.

19 Claims, 6 Drawing Sheets

Related U.S. Application Data continuation of application No. 16/446,873, filed on Jun. 20, 2019, now Pat. No. 11,292,654.

(51) Int. Cl.

| | | |
|---|---|---|
| *B32B 3/26* | (2006.01) | |
| *B32B 7/12* | (2006.01) | |
| *B32B 27/36* | (2006.01) | |
| *B65D 77/20* | (2006.01) | |
| *B65D 75/58* | (2006.01) | |

(52) U.S. Cl.
CPC .......... *B32B 27/36* (2013.01); *B65D 77/2056* (2013.01); *B65D 81/3453* (2013.01); *B32B 2307/31* (2013.01); *B32B 2307/412* (2013.01); *B32B 2307/7242* (2013.01); *B32B 2307/7265* (2013.01); *B32B 2439/70* (2013.01); *B65D 75/5838* (2013.01); *B65D 77/2096* (2013.01); *B65D 2205/00* (2013.01); *B65D 2401/15* (2020.05)

(58) Field of Classification Search
CPC ............ B65D 2205/00; B65D 2401/15; B65D 77/225; B65D 77/30; B32B 1/00; B32B 3/266; B32B 7/12; B32B 27/36; B32B 2307/31; B32B 2307/412; B32B 2307/7242; B32B 2307/7265; B32B 2439/70; B32B 15/085; B32B 15/088; B32B 15/09; B32B 15/12; B32B 27/08; B32B 27/34; B32B 2250/02; B32B 2439/46; B32B 2439/62; B32B 27/10; B32B 27/32

See application file for complete search history.

(56) References Cited

U.S. PATENT DOCUMENTS

| | | | |
|---|---|---|---|
| 3,997,677 | A | 12/1976 | Hirsch et al. |
| 4,847,459 | A | 7/1989 | Desai |
| 4,945,008 | A | 7/1990 | Heyes et al. |
| 5,053,594 | A * | 10/1991 | Thota ................. B65D 81/3453 426/243 |
| 5,114,766 | A * | 5/1992 | Jacques .............. B65D 81/3453 220/360 |
| 5,584,409 | A | 12/1996 | Chemberlen |
| 5,686,126 | A | 11/1997 | Noel et al. |
| 5,782,266 | A | 7/1998 | Domke |
| 5,996,845 | A | 12/1999 | Chan |
| 6,023,915 | A | 2/2000 | Colombo |
| 6,085,942 | A | 7/2000 | Redmond |
| 6,132,780 | A | 10/2000 | Archibald et al. |
| 6,182,850 | B1 | 2/2001 | Marbler et al. |
| 6,269,945 | B1 | 8/2001 | Colombo |
| 7,744,517 | B2 | 6/2010 | Bonefant |
| 7,963,413 | B2 | 6/2011 | Sierra-Gomez et al. |
| 8,114,451 | B2 | 2/2012 | Sierra-Gomez et al. |
| 8,354,131 | B2 * | 1/2013 | Gan ....................... A21D 10/02 426/94 |
| 8,408,792 | B2 | 4/2013 | Cole et al. |
| 8,722,122 | B2 | 5/2014 | Vogt et al. |
| 8,746,490 | B2 | 6/2014 | Huffer et al. |
| 8,777,486 | B2 | 7/2014 | Miyake et al. |
| 9,126,734 | B2 | 9/2015 | von Glasow |
| 9,199,781 | B2 | 12/2015 | Boseman |
| 9,278,796 | B2 | 3/2016 | Huffer et al. |
| 9,850,056 | B2 | 12/2017 | Shaw et al. |
| 9,975,290 | B2 | 5/2018 | Davis et al. |
| 10,118,741 | B2 | 11/2018 | Lyzenga et al. |
| 10,136,757 | B2 | 11/2018 | Mir |
| 10,220,999 | B2 | 3/2019 | Huffer |
| 2001/0012530 | A1 | 8/2001 | Hiyoshi |
| 2002/0096056 | A1 * | 7/2002 | Hopkins ............ B65D 81/3453 99/425 |
| 2003/0152669 | A1 * | 8/2003 | Vadhar ................. B65D 75/305 426/106 |
| 2004/0052993 | A1 * | 3/2004 | Dawes .................... B32B 27/34 428/35.7 |
| 2005/0031814 | A1 * | 2/2005 | Dawes ....................... B32B 7/06 428/347 |
| 2005/0276525 | A1 | 12/2005 | Hebert et al. |
| 2005/0276885 | A1 | 12/2005 | Bennett |
| 2005/0284171 | A1 * | 12/2005 | Harl ...................... A47J 41/0044 165/902 |
| 2007/0071855 | A1 | 3/2007 | Kanzaki |
| 2007/0275133 | A1 | 11/2007 | Sierra-Gomez et al. |
| 2008/0037911 | A1 | 2/2008 | Cole et al. |
| 2008/0063758 | A1 * | 3/2008 | Kwiat .................... A21D 10/02 426/138 |
| 2008/0063760 | A1 * | 3/2008 | Raymond .......... B65D 81/3453 426/531 |
| 2008/0240627 | A1 | 10/2008 | Cole et al. |
| 2009/0045189 | A1 | 2/2009 | Cormier et al. |
| 2009/0226117 | A1 | 9/2009 | Davis et al. |
| 2010/0018974 | A1 | 1/2010 | Lyzenga et al. |
| 2012/0292813 | A1 * | 11/2012 | Middleton ........ B29C 45/14467 264/320 |
| 2013/0260106 | A1 * | 10/2013 | Bohrer .................... B32B 27/34 428/534 |
| 2013/0327763 | A1 * | 12/2013 | Persells .............. B65D 81/3453 219/730 |
| 2014/0110403 | A1 * | 4/2014 | Nedell ..................... H05B 6/80 219/730 |
| 2016/0130064 | A1 | 5/2016 | Klipstine et al. |

OTHER PUBLICATIONS

Self Venting Microwaveable Pouches—Flair. Website viewed and downloaded on Sep. 26, 2019. http://www.flairpackaging.com/pages/packaging_for_dairy_and_deli_flair-flexible_package/packaging_solutions/pouches_dairy/Self%20Venting%20Microwavable%20Pouches/2 (1 page).

* cited by examiner

VENTING SYSTEM FOR OVENABLE CONTAINERS

CROSS-REFERENCE TO RELATED APPLICATIONS

This application is a continuation of U.S. patent application Ser. No. 17/682,579, filed Feb. 28, 2022, also entitled "VENTING SYSTEM FOR OVENABLE CONTAINERS" which is a continuation of U.S. patent application Ser. No. 16/446,873, filed Jun. 20, 2019, entitled "VENTING SYSTEM FOR OVENABLE CONTAINERS", now U.S. Pat. No. 11,292,654, all of which are incorporated herein in their entirety.

FIELD OF THE INVENTION

This invention relates generally to venting systems which are integral to a flexible laminate structure and which are configured to allow gas to vent from within a package during oven or microwave heating processes.

BACKGROUND

Many frozen and/or fresh food products are packaged in containers which are designed to be ovenable—i.e. the container and the food products can be heated in an oven or microwave. For example, prepared, ready-to-eat or frozen meals are packaged in a manner such that they can be removed from the refrigerator or freezer and immediately heated in an oven or microwave.

Typically, the package comprises a receptacle to hold the food, such as a tray. A lidding film may be attached to the tray. The film may protect the food from the environment and may provide the food product with a useful shelf life. The tray may be further packaged within an outer sleeve, such as a paperboard sleeve or a flexible plastic sleeve bearing product information. The outer sleeve may or may not be hermetically sealed.

In typical use, a user removes any outer packaging, such as the outer sleeve, punctures the lidding film or partially peels back the lidding film, and then places the package into an oven or microwave for heating. After heating, the lid is fully removed and the food is consumed directly from the tray or transferred from the tray to a plate or bowl for consumption.

Packages that are warmed in the oven or microwave without some form of venting (puncture, partial removal, etc.) will expand as steam develops within the packaging and the seals, film, or tray may fail or burst under pressure. If the user is required to manually create the vents, there is a chance that the manual piercing or puncture will not be accomplished correctly (i.e. too much damage to the lidding film). In such case, an insufficient amount of steam may be generated within the package and the resulting food product may be dry and unsatisfactory. Likewise, the manual piercing or puncture may not be sufficient and too much steam may be generated internally, leading to partial or total seal failures, tears, and/or bursting. As an alternative to piercing or partially removing the lidding film, laser micro perforations may be used to relieve internal pressures without requiring the user to manually adjust the packaging to relieve pressure, but creating micro perforations in such packaging requires an additional step in the manufacturing process, adding expense and time to the process.

SUMMARY OF THE INVENTION

Through hard work and ingenuity, the inventors have developed an integrated venting system for ovenable food containers. The inventive containers have an integral pathway for steam to escape from the interior of the container, thereby avoiding a failure of the heat seal bonds, unwanted tears or venting, or bursting in the package's weakest area. The venting pathway is created by a specific configuration of adhesive, adhesive-free areas, and die cuts. In an embodiment of the invention, at least one adhesive-free region is disposed along the interface between two flexible laminate layers, along the location of the edge of a flap formed in the layers. There is at least one diecut in the lower film and at least one offset diecut in the upper film, each at least partially located in the adhesive-free region. The steam passes from the lower diecut, through the adhesive-free region, to the upper diecut, and out of the packaging. In an embodiment, the lower and upper die cuts are the same diecuts used to form the integral peelable flap. Thus, there are no additional steps or expense incurred in the manufacturing process. The consumer is not required to peel, remove, tear, pierce, or replace any film prior to heating. Thus, there is no risk of user error with regard to venting. After heating the food product and allowing steam to escape, the top film layer is peeled back for access to the food product. The peelable flap may be completely removed and discarded or replaced onto the container, to reseal the container.

Embodiments of the invention described herein provide improved packages for storing products and associated methods for forming such packages, where the packages are designed to allow gas and steam generated within the package to escape to the external environment while at the same time minimizing or preventing oxygen and/or moisture from entering the package.

In an embodiment, the invention is directed to an ovenable packaging structure having an integral one-way valve comprising an outer flexible structure having an outer cut line which defines a flap that is separable from the outer flexible structure along the outer cut line; an inner flexible structure having an inner cut line which defines an inner opening portion that is separable from the inner structure along the inner cut line, wherein the inner cut line is offset from the outer cut line, and wherein when the inner opening portion is separated from the inner structure, an opening into the ovenable packaging structure is created; an adhesive layer which adheres the outer flexible structure to the inner flexible structure, wherein the adhesive layer comprises a channel of pressure sensitive adhesive which surrounds both the outer cut line and the inner cut line, wherein the channel of pressure sensitive adhesive defines the perimeter of at least one adhesive-free valve chamber within said channel, and wherein the valve chamber comprises at least a portion of the outer cut line and the inner cut line; and a region of permanent adhesive which adheres at least the inner opening portion of the inner flexible structure to the flap of the outer flexible structure In another embodiment, the invention is directed to an ovenable packaging structure having an integral one-way valve comprising an outer flexible structure having an outer cut line which defines a flap that is separable from the outer flexible structure along the outer cut line; an inner flexible structure having an inner cut line which defines an inner opening portion that is separable from the inner structure along the inner cut line, wherein the inner cut line is offset from the outer cut line, and wherein when the inner opening portion is separated from the inner structure, an opening into the ovenable packaging structure is created; wherein a marginal region of the flap is defined between the inner and outer cut lines, the marginal region overlying an underlying surface of the inner structure, wherein a pressure sensitive adhesive is disposed on one of the marginal region of the flap and the underlying surface of the inner structure, wherein the pressure sensitive adhesive defines the perimeter of at least one adhesive-free valve chamber within the marginal region, and wherein the valve chamber comprises at least a portion of the outer cut line and the inner cut line.

In yet another embodiment, the invention is directed to a method of making an integrally-vented ovenable packaging structure comprising providing a first film layer and a second film layer; applying at least a pressure sensitive adhesive to at least one of the first film layer or the second film layer, wherein the pressure sensitive adhesive is applied in a track configuration, and wherein pressure sensitive adhesive is not applied to at least one adhesive-free valve chamber disposed within the track of pressure sensitive adhesive; laminating the first film layer to the second film layer; scoring a first cut line through the first film layer, wherein at least a portion of the first cut line is disposed within the valve chamber and wherein the first cut line defines a flap that is separable from the first film layer along the first cut line; and scoring a second cut line through the second film layer, wherein the second cut line is offset from the first cut line, wherein the second cut line defines an inner opening portion that is separable from the second film layer along the second cut line, and wherein at least a portion of the second cut line is disposed within the valve chamber.

In a still further embodiment, the invention is directed to an ovenable packaging structure having an integral one-way valve comprising a first film layer at least partially adhered to a second film layer with a pressure sensitive adhesive, wherein the pressure sensitive adhesive is disposed in a track configuration, and wherein at least one adhesive-free valve chamber is disposed within the pressure sensitive adhesive track; a first cut line disposed through the first film layer, wherein at least a portion of the first cut line is disposed within the valve chamber and wherein the first cut line defines a flap that is separable from the first film layer along the first cut line; and a second cut line disposed through the second film layer, wherein the second cut line is offset from the first cut line, wherein the second cut line defines an inner opening portion that is separable from the second film layer along the second cut line, and wherein at least a portion of the second cut line is disposed within the valve chamber.

BRIEF DESCRIPTION OF THE DRAWINGS

Figure 1A:
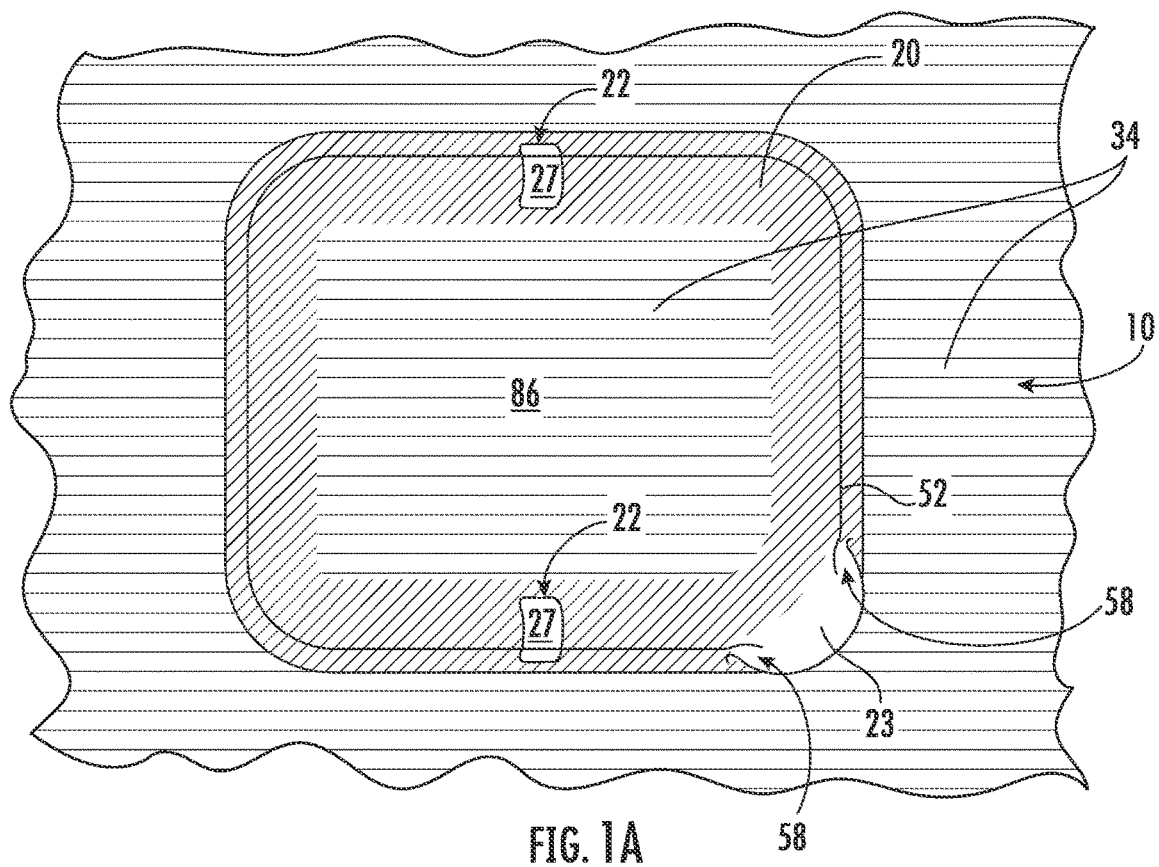
Figure 1B:
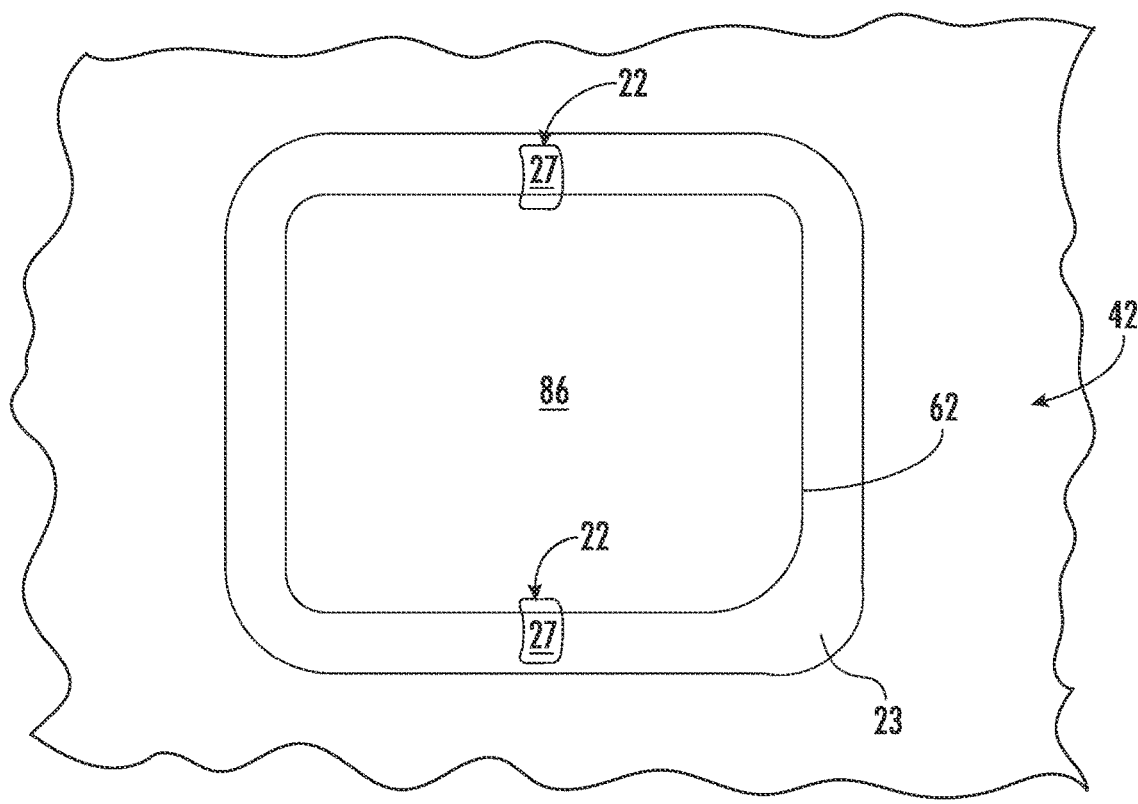
Figure 1C:
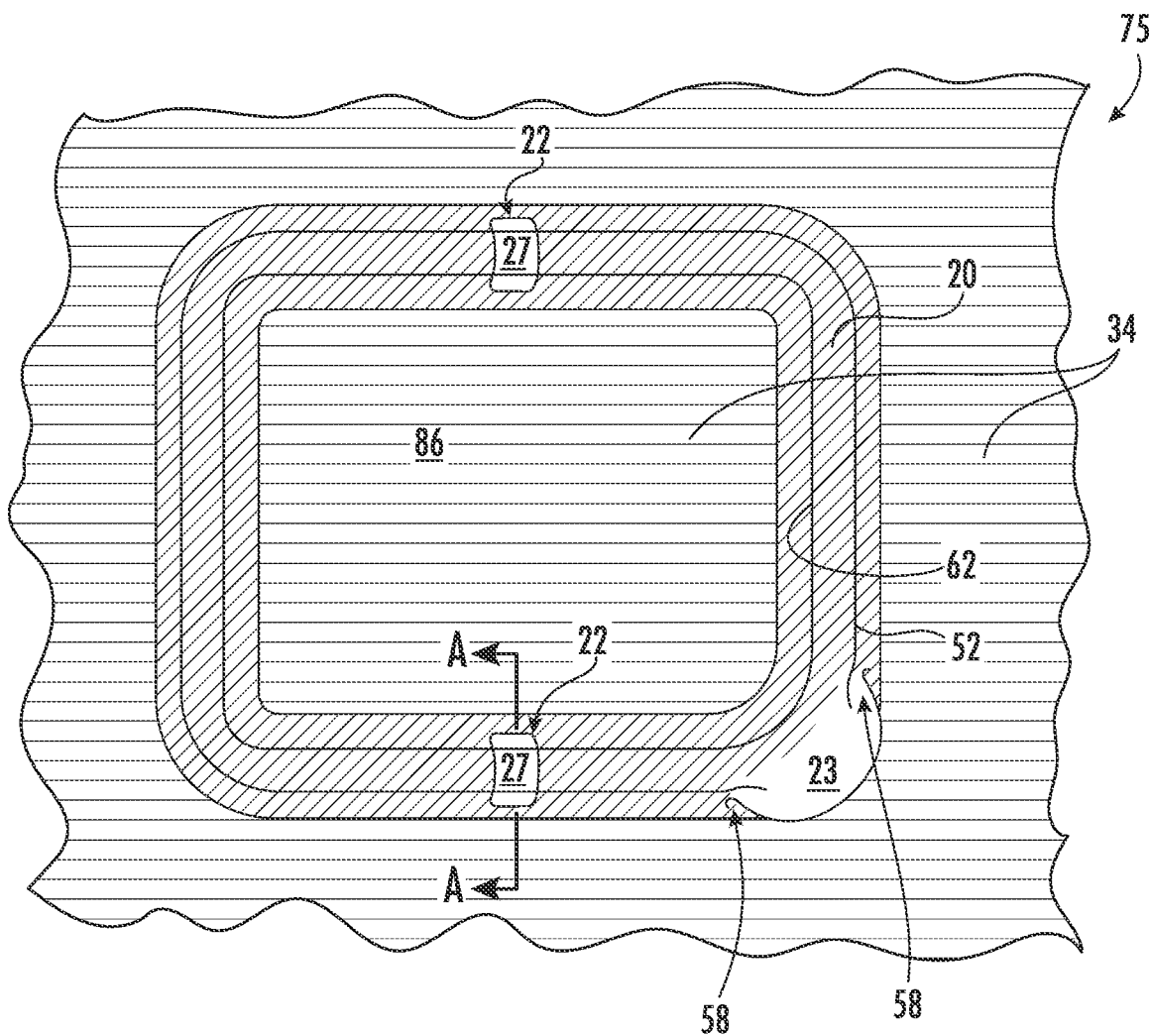
Figure 2:
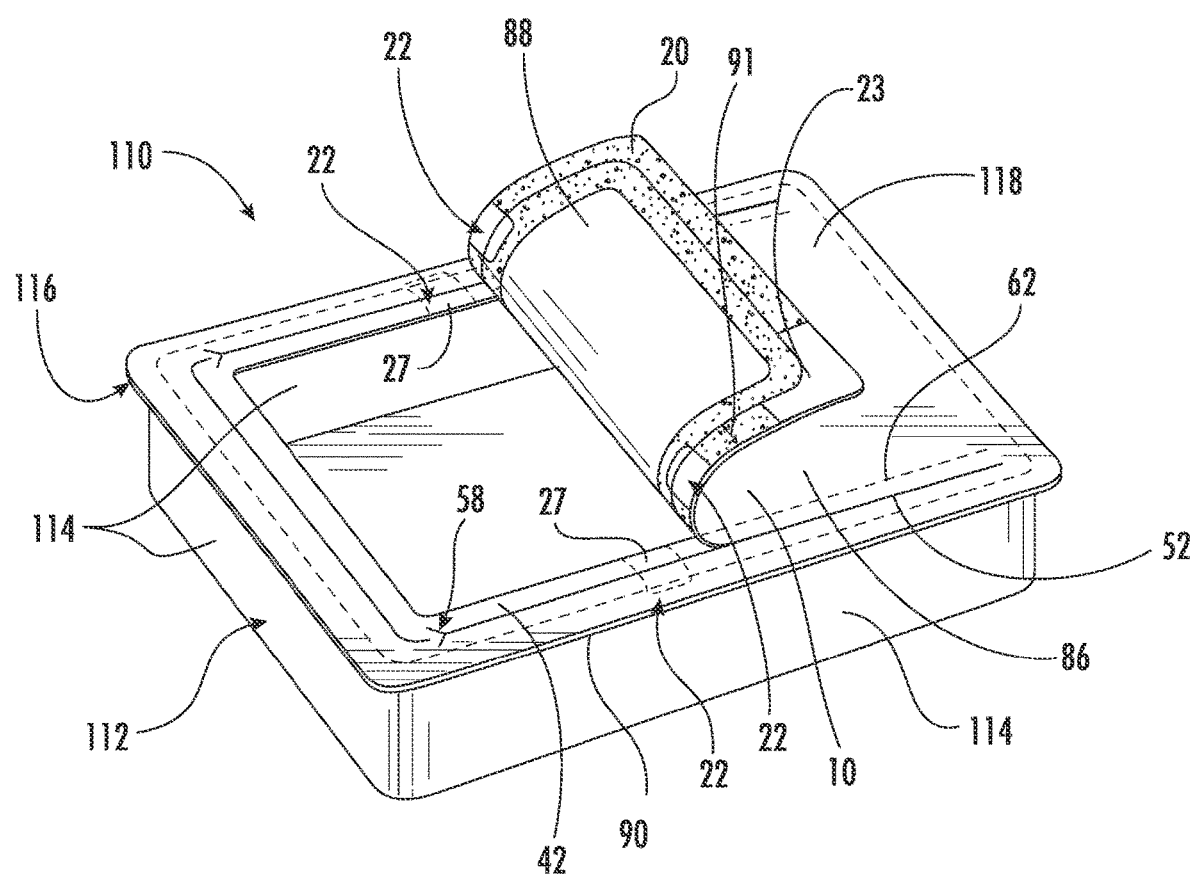
Figure 3A:
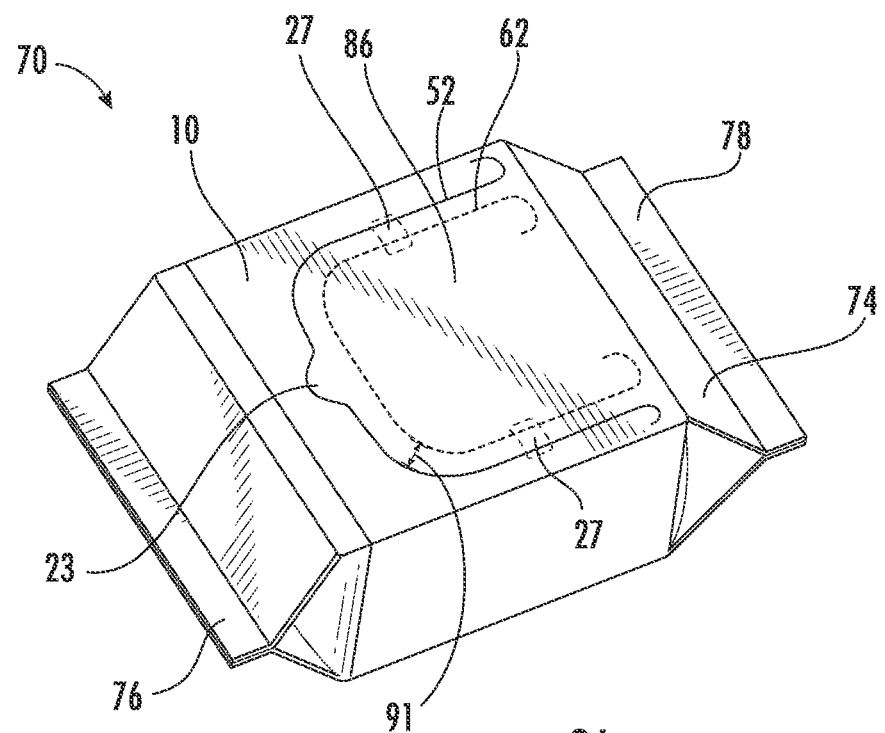
Figure 3B:
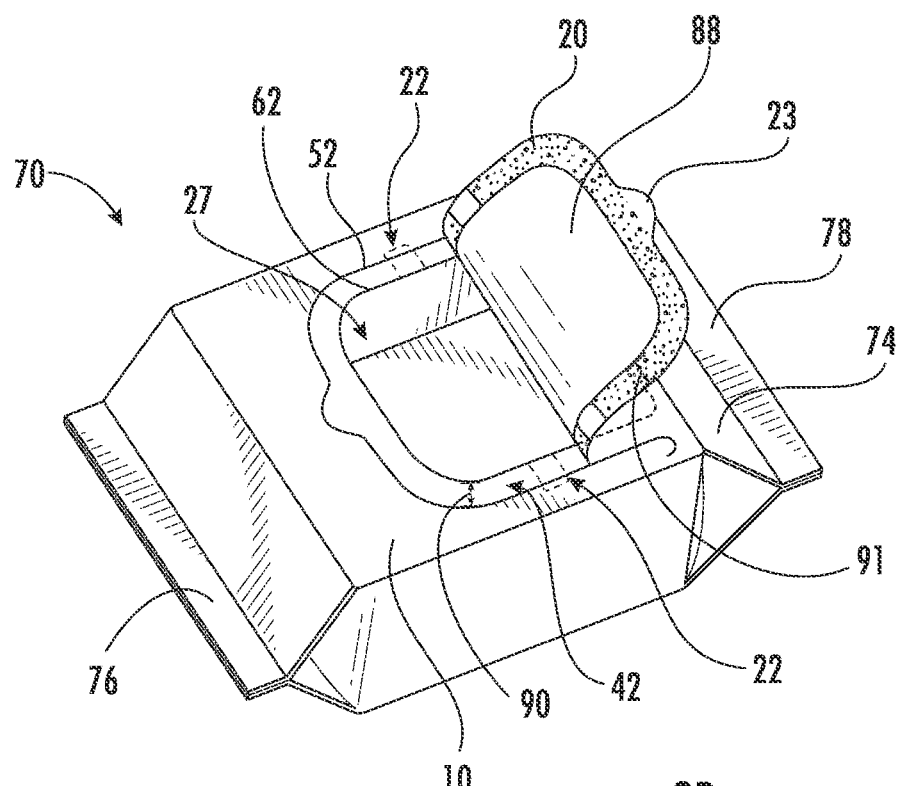
Figure 4A:
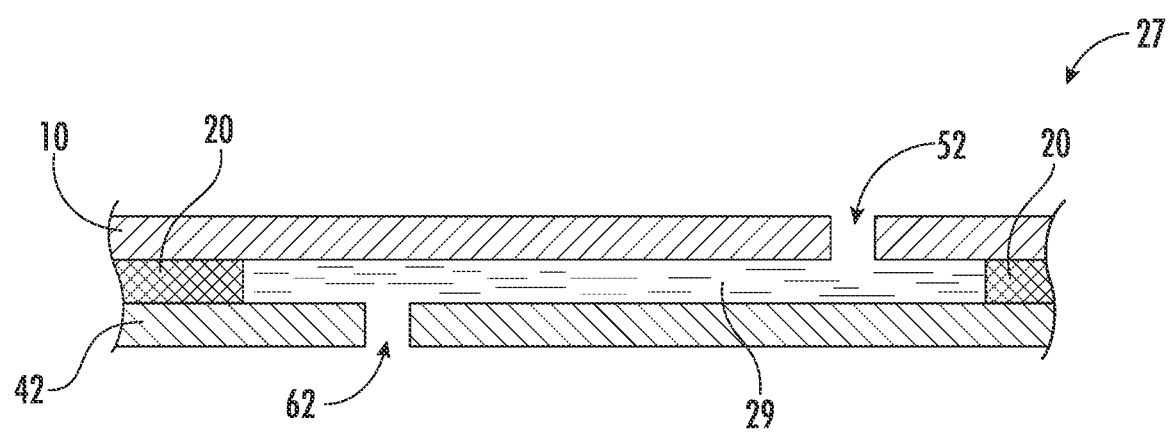
Figure 4B:
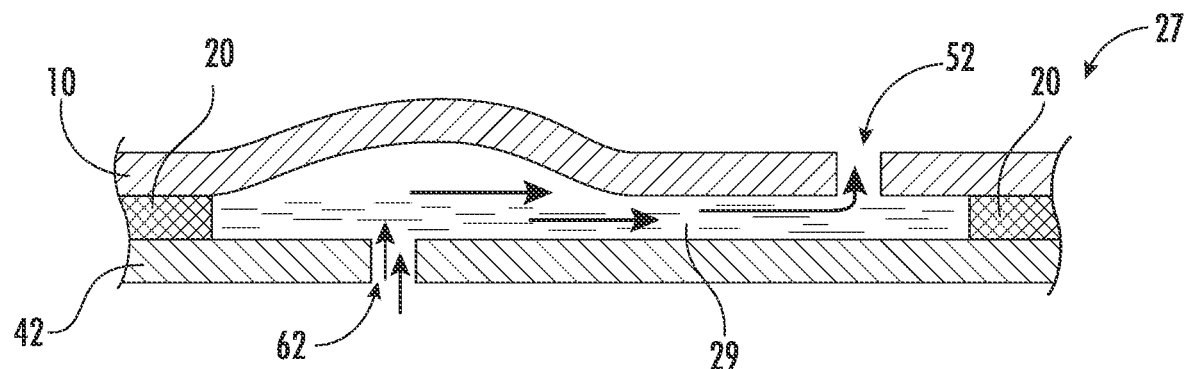
Figure 5A:
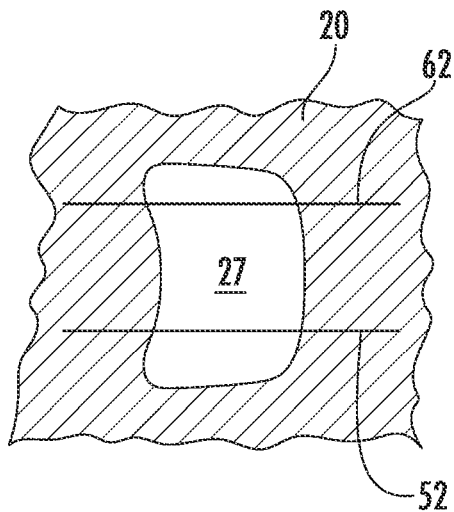
Figure 5B:
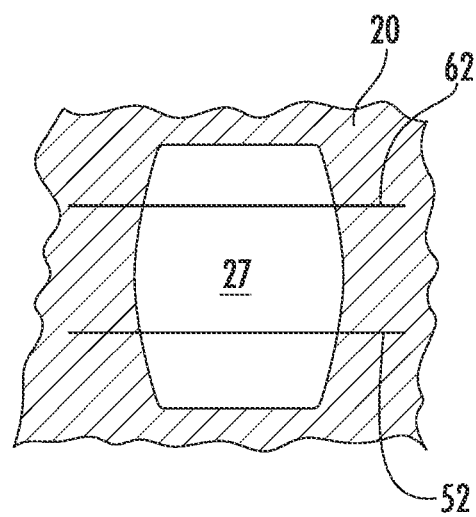
Figure 5C:
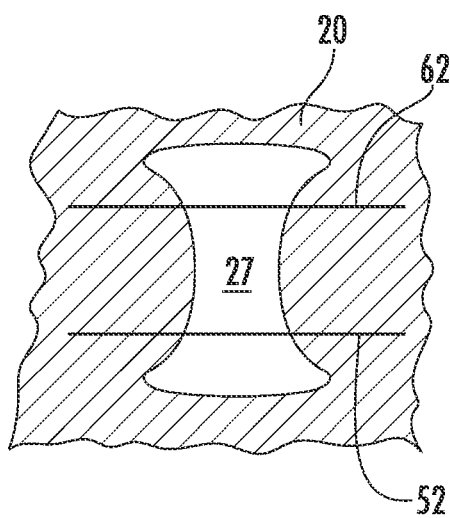
Figure 5D:
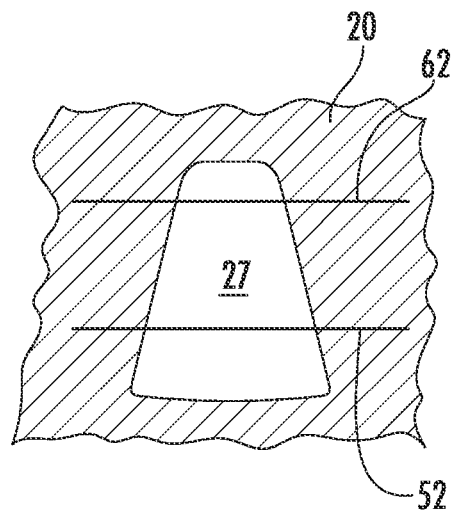

Having thus described the disclosure in general terms, reference will now be made to the accompanying drawings, which are not necessarily drawn to scale, and wherein:

FIGS. 1A-1B illustrate a top view of the layers of the laminate, in an embodiment, and FIG. 1C illustrates the laminate itself, in an embodiment of the invention;

FIG. 2 illustrates an embodiment of a container of the invention;

FIGS. 3A and 3B illustrate an embodiment of a container of the invention in a closed (3A) and open (3B) configuration;

FIGS. 4A and 4B illustrate an exploded cross-sectional view of the valve chamber of the invention, in an embodiment; and FIGS. 5A-5D illustrate various valve chamber configurations of the invention, in an embodiment.

DETAILED DESCRIPTION OF THE INVENTION

The present invention now will be described more fully hereinafter with reference to the accompanying drawings in which some but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

In an embodiment, the invention comprises a laminate which may be applied to a container or package. In this embodiment, the container or package may comprise a flange, rim, or edge and the inventive laminate may be adhered to that flange, rim, or edge. In another embodiment, the invention comprises a multi-ply flexible package. The invention may or may not comprise a rigid tray disposed within the flexible package. If a rigid or semi-rigid tray is disposed within the package, the packaging may be adhered to at least a portion of the tray. In an embodiment, the tray comprises a flange and the packaging is at least partially adhered to the flange of the tray. Regardless of the configuration, a food product may be enclosed within the package and/or tray, and the package may be designed for heating of that food product while within the package.

In an embodiment, the laminate and/or package is configured to have a built-in opening and reclose feature—also referred to herein as a flap. The built-in opening and reclose feature is created, in an embodiment, by forming the laminate or packaging structure as a two-part structure, having an outer structure joined in face-to-face relation with an inner structure. Each of the outer and inner structures can comprise one or more layers of flexible packaging material such as polymer film, paper, metal foil, and/or the like. An outer line of weakness is formed in the outer structure to define an outer opening portion that can be lifted out of the plane of the outer structure. Similarly, an inner line of weakness is formed in the inner structure to define an inner opening portion that can be lifted out of the plane of the inner structure. The outer and inner opening portions are adhered to each other such that the outer and inner opening portions can be lifted out of the plane as a unit (i.e. a flap), thereby creating an opening through the packaging structure, defined by the inner line of weakness, and into the package.

In an embodiment, the outer opening portion is larger in area than the inner opening portion and has a marginal region that extends beyond the peripheral edge of the inner opening portion. When the outer and inner opening portions are lifted out of the plane to create the opening, an underlying portion of the inner structure in registration with the marginal region of the outer opening portion is exposed adjacent the opening. This may be referred to as the marginal region of the inner structure. A pressure-sensitive adhesive is applied to either the marginal region of the outer opening portion or the underlying portion of the inner structure (the inner structure marginal region). After initial lifting of the outer and inner opening portions, the opening through the structure can be reclosed by adhering the marginal region of the outer opening portion to the underlying portion (or marginal region) of the inner structure via the pressure-sensitive adhesive. A venting system, as will be more fully described below, is disposed within the marginal region of the packaging.

Referring now to the drawings, FIGS. 1A and 1B illustrate a first structure 10 and second structure 42 which may be utilized in an embodiment of the invention. The first structure 10 and/or the second structure 42 may be single ply or may comprise multiple layers of flexible packaging material. Various materials can be used for the layer(s) of the first structure 10 and/or the second structure 42, including polymers such polyesters, polyolefins (including homopolymers and copolymers), polyamides, and others; paper; metal foil; and the like. In a preferred embodiment of the invention, the first structure 10 may include an outer layer that is substantially transparent, may be reverse-printed or outer surface printed, and/or may be printed with graphics, logos, product information, etc. As an example, the first structure 10 may comprise a layer of polyester such as polyethylene terephthalate or the like.

In an embodiment, the first structure 10 is at least partially adhered or laminated to the second structure 42 via a layer of adhesive. In one embodiment, the adhesive may comprise at least a pressure sensitive adhesive ("PSA") 20. The PSA 20 may be applied to either of the first structure 10 or the second structure 42. The PSA layer 20 may be applied in a predetermined pattern, in an embodiment. The predetermined pattern may be generally U-shaped, square, circular, ovular, or any other shape known in the art. The shape of the PSA layer 20 may mirror the shape of the container, generally, or the lid or flange, if applicable. The PSA layer 20 may be a closed shape in some embodiments. In an embodiment, the PSA layer may be a continuous line in the shape of a square, circular, ovular, or any other shape known in the art. Alternatively, the PSA 20 may be disposed in a channel, track or ring configuration—that is, the PSA 20 may comprise a closed track of a particular width (i.e. a circular track, square track, rectangular track, ovular track, or other closed shape). Similarly, the PSA 20 may be disposed in an open channel, track or ring configuration—that is, the PSA 20 may comprise a track of a particular width but may be open on at least one end (i.e. a U-shape, V-shape, or C-shape). Within the interior of the track or channel (i.e. the area identified as numeral 86), PSA 20 may or may not be present. An embodiment of this configuration is shown in FIGS. 1A-1C. It should be understood that any pattern of PSA 20 which accomplishes the purposes set forth herein may be utilized herein. In other embodiments, the PSA layer 20 may be flood coated (i.e. 100% or nearly 100% coverage) onto either of the first structure 10 or the second structure 42, optionally avoiding adhesive-free areas (discussed below) or deadening the PSA 20 in such areas.

The PSA 20 may comprise a variety of compositions and can comprise any PSA known in the art. Additives (e.g., particulates or the like) can be added to the pressure-sensitive adhesive 20 to reduce the tenacity of the bond to the underlying structure, if desired, so that the pressure-sensitive adhesive 20 readily detaches from the opposite structure on opening (particularly on the very first opening).

In another embodiment, the first structure 10 is at least partially adhered to the second structure 42 via a permanent adhesive 34. Any permanent adhesive known in the art may be utilized. The permanent adhesive 34 may be applied to either of the first structure 10 or the second structure 42. The permanent adhesive 34 may be applied in a predetermined pattern or may be flood coated. If pattern applied, the pattern of permanent adhesive 34 may be generally U-shaped, square, circular, ovular, or any other shape known in the art. The shape of the permanent adhesive 34 may mirror the shape of the container, generally, or the lid or flange, if applicable. The permanent adhesive 34 may be a closed shape in some embodiments. In an embodiment, the permanent adhesive 34 may be a continuous line in the shape of a square, circular, ovular, or any other shape known in the art. Alternatively, the permanent adhesive 34 may be disposed in a channel, track or ring configuration—that is, the permanent adhesive 34 may comprise a closed track of a particular width (i.e. a circular track, square track, rectangular track, ovular track, or other closed shape). It should be understood that any pattern of permanent adhesive 34 which accomplishes the purposes set forth herein may be utilized herein. In other embodiments, the permanent adhesive 34 may be flood coated (i.e. 100% or nearly 100% coverage) onto either of the first structure 10 or the second structure 42, optionally avoiding adhesive-free areas (discussed below) or deadening the permanent adhesive 34 in such areas.

In some embodiments, a combination of permanent adhesive 34 and PSA 20 is utilized. In this embodiment, the permanent adhesive 34 may be applied outside the perimeter of the PSA 20 and may mirror the shape of the PSA 20. In another embodiment, the permanent adhesive 34 may be applied outside the perimeter of the PSA 20 and throughout the remainder of the packaging structure. In an embodiment, the permanent adhesive 34 may be applied inside the perimeter of the PSA 20 and may mirror the shape of the PSA 20. In an embodiment, the PSA 20 may be disposed in a track configuration and the permanent adhesive 34 may be disposed outside and inside the perimeter of the PSA 20 track. In an embodiment, the permanent adhesive 34 does not cover the PSA 20. In an embodiment, the permanent adhesive 34 may be disposed throughout the interface of the first structure 10 and the second structure 42 but for any PSA 20 areas and any adhesive-free areas (discussed below).

While use of both PSA 20 and permanent adhesive 34 are contemplated herein, it should also be understood that the first structure 10 and the second structure 42 could utilize only PSA 20 between them. Likewise, the first structure 10 and the second structure 42 could utilize only permanent adhesive 34 between them. In the latter embodiment, the package may not be resealable, which is an embodiment encompassed by the invention.

In an embodiment, there is at least one interrupted portion 22 wherein the otherwise continuous pattern of adhesive (whether it is PSA 20, permanent adhesive 34, or a combination thereof) is interrupted or is discontinuous. In this embodiment, the first structure 10 and the second structure 42 may both be adhesive-free in the interrupted area 22. That is, between first structure 10 and second structure 42, there may be an interrupted region 22 which contains no adhesive (or any applied adhesive may be deadened), but is otherwise surrounded by adhesive. In an embodiment, the interrupted portion 22 may appear as a patch, in that it is an adhesive-free area surrounded by either PSA 20, permanent adhesive 34, or a combination of PSA 20 and permanent adhesive 34. In an embodiment, the disposition of the adhesive defines the perimeter of the interrupted region 22 (and thereby, the valve chamber, discussed below). In an embodiment, the PSA 20 is disposed in a channel or track configuration (shown in FIG. 1) and the at least one interrupted region 22 is disposed within the interior of the track. That is, the interrupted region 22 is surrounded on all sides by PSA 20 which is disposed in a track configuration.

The first structure 10 may comprise a first, or outer, score line 52 formed through its thickness. In an embodiment, score line 52 defines a flap or outer opening portion 86 (shown in FIG. 2) which is peeled back to create an opening through the laminate. The flap 86 may be peelable and replaceable or may be entirely removable from the packaging structure. The flap 86 defined by score line 52 may be a closed shape (see FIG. 2), such as a square, rectangle, circle, oval or ellipse, in an embodiment. In this embodiment, score line 52 may be continuous. In other embodiments, the flap 86 may be cut on multiple, but not all of its sides. For example, the flap 86 may be cut on three sides but may remain attached to the packaging structure on its fourth side, as shown in FIGS. 3A and 3B. In this embodiment, score line 52 is discontinuous.

Outer score line 52 and/or inner score line 62 may be referred to herein as a cut line and/or line of weakness. It should be understood that the terms "line of weakness," "cut line" and "score line," as used herein, may refer either to a complete cutting through the thickness of one or more layers 10, 42, a partial cutting through of the thickness of such layer(s) allowing the layer(s) to be severed along the score line, and/or a perforation wherein each of the perforations extends completely through the thickness of one or more layers 10, 42, allowing the layer(s) to be severed along the score line.

In an embodiment wherein both PSA 20 and permanent adhesive 34 are utilized, and the first score line 52 may be in registration with (i.e., coincides with) the outer perimeter of the PSA 20. In another embodiment, however, the first score line 52 is at least partially inside the outer perimeter of the PSA 20—that is the PSA 20 extends at least partially outwardly beyond, or across, the first score line 52. In an embodiment, score line 52 is continuous (meaning connected end-to-end) and is contained within a track configuration of the PSA 20. That is, on both sides of score line 52, PSA 20 is disposed. In an embodiment, the first score line 52 extends substantially or entirely through the thickness of the first structure 10, but does not extend to any substantial extent into the second structure 42.

In an embodiment, the second structure 42 may also comprise a second, or inner, score line 62 formed through its thickness. In an embodiment, score line 62 defines an opening into the packaging. In an embodiment, the second score line 62 is spaced inwardly of the first score line 52 so as to define an inner opening portion 88 of the second film structure 42, which is of smaller area than the flap 86 formed in the first film structure 10. In any case, the second score line 62 is offset from the first score line 52.

In an embodiment wherein the PSA 20 has been pattern-applied, the second score line 62 may be in registration with (i.e., coincides with) the inner perimeter of the pattern of PSA 20. In another embodiment, however, the second score line 62 may be at least partially inside the outer perimeter of the pattern of PSA 20—that is, the PSA 20 may extend at least partially beyond, or across, the perimeter of the second score line 62. In an embodiment, score line 62 is continuous (i.e. connected end-to-end) and is contained within a track configuration of the PSA 20. That is, on both sides of score line 62, PSA 20 is disposed. In an embodiment, the second score line 62 extends substantially through the thickness of the second structure 42, but preferably does not extend to any substantial extent into the first structure 10.

In a particular embodiment, the PSA 20 is disposed in a track configuration, score line 62 is end-to-end continuous and is contained within the track configuration, and score line 52 is end-to-end continuous and is contained within the track configuration. In another embodiment, the PSA 20 is disposed in a track configuration, score line 62 is contained within the track configuration, and score line 52 is contained within the track portion. That is, on both sides of each of the score lines 52, 62, PSA 20 is disposed. In an embodiment, the PSA 20 is disposed in a track configuration, score line 62 is disposed within the track configuration, score line 52 is disposed within the track configuration, and an interrupted area 22 is disposed within the track configuration, wherein the interrupted area 22 is surrounded by PSA 20.

In a different embodiment, the PSA 20 is disposed in a U-shaped configuration, score line 62 is not end-to-end continuous and is disposed within the U-shaped configuration, and score line 52 is not end-to-end continuous and is disposed within the U-shaped configuration. That is, on both sides of each of the score lines 52, 62, PSA 20 is disposed. In this embodiment, interrupted area 22 is disposed within the U-shaped PSA 20 configuration, wherein the interrupted area 22 is surrounded by PSA 20.

As further described below, the inner opening portion 88 is adhered to the outer flap 86 (either by the permanent adhesive 34 or by the pressure-sensitive adhesive 20, applied between the two structures 10, 42), such that both portions 86, 88 are lifted together and remain adhered when opening the package. That is, when the flap 86 is pulled away from the packaging, the inner opening portion 88 separates from the remainder of the second structure 42 and lifts with the flap 86. In an embodiment, the inner opening portion 88 is a closed shape (regardless of the shape of the flap) and separates entirely from the remainder of the inner structure 42 upon opening. In an embodiment, the inner opening portion 88 remains permanently affixed to the flap 86 throughout the opening and reclose processes. In an embodiment, inner opening portion 88 defines the opening into the package upon opening.

In an embodiment, as described above, at least one interrupted area 22 is disposed within the perimeter of the PSA 20 zone. The interrupted area 22 is adhesive free. In an embodiment, a valve chamber 27 is defined within or comprises the interrupted area 22 of the laminate. The valve chamber 27 includes at least a portion of first score line 52 and second score line 62. In an embodiment, these portions of first score line 52 and second score line 62 are the inlet and outlet valves of the valve chamber 27. Thus, because first score line 52 and second score line 62 are formed as part of the construction of the inner opening portion 88 and the flap 86, no extra cutting or scoring steps are needed in the manufacturing process. The valves and the valve chamber 27 are integral to the construction of the laminate 75.

In an embodiment, score line 62 is disposed inside or interior of (with reference to the perimeter of the container), or is offset from (e.g., spaced apart from), score line 52. In an embodiment, a channel is created between the score lines 52 and 62. In an embodiment, gasses or steam formed inside the package may escape from the package by traveling from cut line 62, through the channel, to cut line 52, and may then exit the package. Because there is no adhesive in the valve chamber 27, gasses and steam may pass through the chamber once the pressure within the package exceeds the pressure outside the package.

The distance of the offset between the score lines 52 and 62 determines the length of the channel through which gasses or steam must flow to exit the packaging. For example, if score line 62 is disposed further from score line 52, the gas flow channel will be longer. If score line 62 is disposed closer to score line 52, the gas flow channel will be shorter, which may allow gasses and steam to escape more easily. This, of course, must be balanced against providing a flap having a marginal region which is functional—i.e. maintains its seal and is resealable, if desired. As noted above, in an embodiment, the valve chamber 27 is generally adhesive-free or any adhesive that has been applied in the area of the valve chamber 27 has been deadened.

In an embodiment, the container comprises at least two interrupted areas 22 and valve chambers 27. In this embodiment, the valve chambers 27 may be located on opposite sides of the flap 86. In an embodiment, the container comprises at least three interrupted areas 22 and valve chambers 27. In this embodiment, the valve chambers 27 may be located along three different side edges of the flap 86.

A cross-section of an exemplary valve chamber 27, as taken along line A-A of FIG. 1C, is shown in FIG. 4A in a closed position and in FIG. 4B in an open position. With reference to FIGS. 4A and 4B, the valve chamber 27 includes a portion of the first and second cut lines 52, 62, such that the portion of first and second cut lines are contained within a perimeter of the valve chamber 27.

As noted, the valve chamber 27 may be an area of the flexible laminate 75 that is devoid of adhesive 20, 34 adhering the first and second film layers 10, 42 to each other. In this way, the perimeter of the valve chamber 27 may be the intersection of an area including adhesive (PSA 20 and/or permanent adhesive 34) and an area devoid of adhesive (or wherein the adhesive has been deadened). Said another way, the adhesive 20, 34 locations may define the perimeter of the valve chamber 27. In an embodiment, the valve chamber 27 is bounded on two sides by PSA 20 and on the other two sides by permanent adhesive 34. In another embodiment, the valve chamber 27 is bounded on all sides by PSA 20. In yet another embodiment, the valve chamber 27 is bounded on all sides by permanent adhesive 34.

In an embodiment, the valve chamber 27 is generally square, rectangular, ovular, circular, or elliptical. In another embodiment, the valve chamber 27 has an irregular or asymmetrical shape. The valve chamber 27 shown in FIGS. 1A-1C, for example, has a symmetrical shape in one dimension (i.e. vertical or horizontal) but not in the other dimension.

FIGS. 5A-5D illustrate exploded views of a variety of shapes for valve chamber 27 which could be utilized. However, it should be understood that valve chamber 27 should not be limited to the shapes illustrated. Any shape known in the art may be utilized as the perimeter of the valve chamber 27.

Likewise, any size of the valve chamber 27 is encompassed in the invention. In an embodiment, the valve chamber 27 may extend beyond each cut line 52, 62 by a particular distance. In an embodiment, that distance may be between about ⅛ inch and ½ inch. In an embodiment, the number of valve chambers 27 disposed in the inventive system may be one, two, or more. Once a particular valve chamber vents the interior of the container, the other valve chambers may not function due to the pressure relief. Thus, having multiple valve chambers 27 may be advantageous in some embodiments.

In an embodiment described herein, the portions of the valve 27 which intersect or cross cut lines 52, 62 are referred to as the "sides" of the valve, regardless of the shape of the valve itself. For example, the valve 27 may be circular or ovular, but each portion of the perimeter of valve chamber 27 which crosses the cut line 52 and 62 may be referred to as a side. In this embodiment, the valve chamber 27 could have convex and/or concave sides on one or both sides of the valve chamber 27. In a particular embodiment, valve chamber 27 could have one side which is convex and the other side which is concave. In an embodiment, each side of the valve has a curvature and each side is curved in the same manner, such that steam and/or gasses are directed from the inner cut line to the outer cut line. In an embodiment, the sides of the valve which cross the cut lines 52, 62 may be angled, but straight (not curved). In an embodiment, the sides of the valve may be angled in the same direction or in opposite directions. The sides of the valve which intersect or cross the cut lines 52, 62 may be parallel, in an embodiment.

In an embodiment, the radius of curvature of the perimeter of the valve chamber 27 is the same or similar at the intersection of that perimeter with cut line 52 and cut line 62.

In an embodiment, the shape of the valve chamber 27 may direct the flow of gasses from the interior cut line to the exterior cut line of the valve. For example, in an embodiment shown in FIG. 5C, each side of the valve chamber 27 curves inwardly, creating a more narrow channel from interior cut line 62 toward exterior line 52, thereby directed gasses and steam to flow toward exterior cut line 52.

In an embodiment, the valve chamber 27 may comprise a viscous medium, such as oil 29. The oil 29 may be pattern-applied to at least one of the first 10 or second 42 film layers and may be disposed between the first 10 and second 42 film layers so as to occupy at least a portion of the valve chamber 27. The oil 29 may, for example, be silicone oil in some cases. The presence of the oil 29 may encourage the opposing surfaces of the first and second film layers 10, 42 (e.g., the surface of each film layer that is adjacent to or most proximate the other film layer) to maintain contact with each other (with the oil disposed therebetween) by virtue of the viscosity and/or surface tension of the oil, such that the integrated valve is biased towards the closed position shown in FIG. 4A when the pressure inside the package is below a certain threshold pressure. For example, in some embodiments, the volume of oil 29 disposed between the first and second film layers 10, 42 is selected such that the valve opens when the pressure inside the package just exceeds the atmospheric pressure outside the package. An example of a desirable range of pressures inside the package for moving the first layer 10 towards the open position shown in FIG. 4B is approximately 0.1 psi to approximately 0.8 psi.

In some embodiments, an opposing surface of at least one of the first or second film layers 10, 42 may further include a surface treatment configured to decrease an amount of surface energy between the first and second film layers in the valve area. The surface energy may be characterized as the amount of energy required to adhere the opposing surfaces of the first and second film layers 10, 42 to each other. Thus, while the addition of the oil 29 in the valve chamber 27 between the opposing surfaces of the first and second film layers 10, 42 serves to increase the surface energy of the interface between the opposing film surfaces, the resulting surface energy may be too great to allow the valve to open at the desired pressure level of the package interior. The inclusion of the surface treatment for at least one of the opposing surfaces of the first and second film layers 10, 42, however, may counteract the increased adhesion force imparted by the oil 29, thereby reducing the surface energy to a level that allows the valve to be moved from the closed configuration to the open configuration when a desired level of pressure is achieved within the package.

In some embodiments, for example, the surface treatment may comprise at least one of a printed ink, a coating, or a texture that is applied to one or both of the opposing surfaces of the first and second film layers 10, 42. The surface treatment (e.g., the printed ink, coating, or texture) may serve to create bumps or ridges that extend from the surface of the respective film layer 10, 42 that is treated toward the opposing surface of the other film layer.

Accordingly, the surface energy of the interface between the first and second film layers 10, 42 may be decreased due to the reduced contact area between the two film layers. For example, instead of substantially the entire opposing surface of the first film layer 10 in the valve area contacting substantially the entire opposing surface of the second film layer 42 in the valve area, in which case the surface energy would be at a maximum, the ridges created by the surface treatment in some embodiments may reduce the contact area to the sum of the areas over which each of the ridges contacts the corresponding locations of the opposing surface of the respective film layer. The inventors have found that the smaller the contact area, the less energy is required to separate the first and second film layers 10, 42, and the less internal package pressure is needed to move the valve from the closed configuration to the open configuration. Accordingly, the type of surface treatment, the number of ridges created, and/or the amount of inherent separation between the first and second film layers 10, 42 caused by the extension of the ridges may be selected to achieve a desired surface energy that results in the opening of the valve at the desired package pressure. In addition, the pattern of the ridges may be selected to further tune the opening and closure of the valve, depending on the requirements of the package. In some cases, the thickness of the surface treatment (e.g., thickness of the coating used), the roughness imparted by the surface treatment (e.g., based on the chemical makeup of the surface treatment), and the location of the surface treatment may also affect the resulting surface energy.

In an embodiment, the laminate, label, and/or package includes an adhesive-free region to form a thumb tab or grasping portion 23. In this embodiment, adhesive is not disposed (or is deadened) between the first structure 10 and the second structure 42 in the location of the tab 23. Thus, the thumb tab 23 may comprise a portion of the first structure 10 which is graspable because it is unadhered to the second structure 42. The thumb tab 23 may be defined by the score line 52, such that it is continuous with the flap 86.

The first score line 52 may, in an embodiment, include one or more tamper-evidence features 58. The tamper evidence features 58 may comprise one or more areas in which the first structure 10 is not cut or scored along score line 52, and whose cut or uncut condition may be readily apparent from a visual inspection of the first structure 10. Said another way, the score line 52 may have portions wherein the film is not cut, between two portions of score line 52 which are cut. The score line 52 may be discontinuous in these areas. That is, the film on one side of the score line 52 may be continuous with the film on the other side of score line 52 in these areas. These areas may, in an embodiment, be referred to as the tamper-evidence features.

In an embodiment of use, the first structure 10 must be torn, through the tamper-evidence features 58, to connect the portions of the first score line 52 on opposite sides of each tamper-evidence feature 58. In an embodiment, to help ensure that the two portions of the score line will be connected even if the tear line tends to wander in a direction, the score line 52 at the "downstream" side of each tamper-evidence feature 58 can terminate in a j-hook or U- or V-shaped portion that extends generally transverse to the direction along which the score line 52 extends. The "downstream" side refers to the side of the tamper-evidence feature that is located farthest along the downstream direction in which the flap 86 is peeled back when opening the package. In an embodiment, the first structure 10 is cut through its thickness along the transverse portion, similar to the rest of the score line 52. Accordingly, even if the tear line wanders to one side or the other, it will connect with the transverse portion and thereby allow the score line 52 to continue to sever or separate as the flap 86 is peeled farther back.

In an embodiment, the tamper-evidence features 58 are located with respect to the outer score line 52 such that in order to lift the flap 86 far enough to just begin lifting the inner opening portion 88 and thereby begin to create an opening into the package, the tamper evidence features 58 must be torn through. In this regard, the tamper evidence feature(s) 58 are not further along the downstream direction, or at least are not substantially further along the downstream direction, than is the most-upstream portion of the inner score line 62. In a particular embodiment, the tamper evidence feature 58 is located within the perimeter of or near the tab 23. While certain tamper-evidence features 58 are discussed herein, it should be understood that any tamper evidence features known in the art are encompassed within the scope of the invention.

In an embodiment, the valve chamber(s) 27 are not located near the tab 23 and/or the tamper evidence features 58, if any are present. In an embodiment, the valve chamber(s) 27 are located on a side of the packaging that is opposite the tab 23 and/or the tamper evidence features 58. In an embodiment, at least one of the valve chamber(s) 27 are located along a corner of the flap 86 that is opposite the tab 23 and/or the tamper evidence features 58. In an embodiment, at least one of the valve chamber(s) 27 are located along a side of the flap 86 that is not a side which comprises the tab 23 and/or the tamper evidence features 58. In an embodiment, at least one of the valve chamber(s) 27 are located on a side of the packaging that is opposite the tab 23 and/or the tamper evidence features 58. In an embodiment, at least one of the valve chamber(s) 27 are located at least half of the distance of the flap 86 away from the tab 23 and/or the tamper evidence features 58. Separating the valve 27 from the tab 23 and/or the tamper evidence features 58 may help prevent issues with separation of the tab 23 and/or interference with the tamper evidence features 58 when the steam releases through the valve 27.

In one embodiment, the laminate 75 described herein (FIG. 1C) is a lidding film which is affixed to the rim, edge, or flange 116 of a rigid or semi-rigid container to form a container assembly 110 (FIG. 2). The flexible laminate 75 may comprise a lidding stock, for example, for forming flexible lids that can be secured (e.g., by heat-sealing or the like) to a flange of a tray or other container that contains the contents. In this embodiment, the laminate 75 may comprise a layer of adhesive on the underside of the second film layer 42, such that layer 42 can be adhered to the container.

In this embodiment, the lid includes a built-in opening and reclose feature. For instance, FIG. 2 shows a package assembly 110 comprising a container body 112 having a side wall 114 and a flange 116 extending outwardly from the upper edge of the side wall. The container body 112 can comprise various materials (e.g., polymer, paper, foil, etc.) and can be formed by various methods (e.g., thermoforming, molding, etc.). The open top of the container body may be closed by a lidding laminate 118 formed of a flexible laminate 75 in accordance with the invention. The lidding laminate 118 is sealed to the flange 116, in an embodiment, by any suitable technique, such that the lidding laminate 118 is firmly attached to the flange. The lidding laminate 118 includes an opening/reclose feature formed by a first score line 52, second score line 62 and pressure-sensitive adhesive 20. The package 110 also includes a thumb tab 23. As can be seen in FIG. 2, the interrupted area 22 is disposed entirely within the PSA 20 area, in an embodiment.

In another embodiment, the laminate 75 is used to form a flexible package 70 which envelopes the contents (FIGS. 3A and 3B). With reference to FIG. 3A, the package 70 is shown in a closed condition, for example as initially filled and sealed in a packaging plant. FIG. 3B illustrates the package 70 in an open condition. It should be understood that while FIGS. 3A and 3B illustrate the package 70 as having a non-removable flap 86, the flap 86 may be completely removable in an embodiment. Thus, the cut lines 52, 62, may each define a closed shape in order to create such flap 86.

The package includes an outer wrapper 74 that envelopes the package contents and is sealed to enclose the contents. The outer wrapper 74 may or may not container a rigid or semi-rigid tray which contains the contents. In an embodiment, the outer wrapper 74 comprises a packaging laminate 75 made by a method in accordance with the invention, such as the laminate 75 previously described. The outer wrapper 74 is manipulated into a tubular shape and the longitudinal edges of the wrapper 74 are sealed together by a suitable sealant material to form a longitudinal seal, typically adjacent the bottom surface of the package. The opposing portions of the wrapper 74 are sealed together along transverse seal lines 76, 78 adjacent the opposite ends of the tubular wrapper. The ends of the wrapper 74 can be gusseted if desired, as known in the art.

In the illustrated package, the portion of the outer wrapper 74 having the score lines 52, 62 is provided on the top surface of the package. However, it should be understood that any surface of the package may comprise the score lines 52, 62 and the flap 86. The area of the wrapper 74 bounded by the score lines can constitute any fraction of the total top surface of the package. In an embodiment, the score lines 52, 62, have a small width, on the order of a few thousandths of an inch.

In either embodiment, there is an inner marginal region 90 on the inner opening portion 88 and an outer marginal region 91 on the flap 86. These marginal regions are disposed atop one another. The outer marginal region 91 extends from the edge of the flap 86 to at least the edge of the inner opening portion 88, and may extend beyond the inner opening portion 88. The inner marginal region 90 extends from the edge of the inner opening portion 88 to at least the edge of the flap 86, and may extend beyond the flap 86.

PSA 20 is generally disposed between the first structure 10 and the second structure 42, on either or both of inner marginal region 90 and outer marginal region 91. In an embodiment, the PSA 20 is disposed on the outer structure 10. In this embodiment, the outer structure 10 preferably has a greater affinity for bonding with the PSA 20 than does the surface of the inner structure 42, and, upon opening the package, the PSA 20 is detached from the surface of inner structure 42 (in an embodiment) and remains attached to the outer marginal region 90 as shown in FIGS. 2 and 3B. Once opened, the package may be reclosable, in an embodiment, due to the PSA 20 in one or both of the marginal regions 90, 91. The flap 86 may be reattached to the remainder of the laminate, using the PSA 20, to restore the package to a closed condition. As noted, although it is contemplated to apply the PSA 20 to the outer structure 10 and to remain on the outer structure 10 upon opening, it is also within the scope of the invention to apply the PSA 20 to the inner structure 42 and to remain on the inner structure 42 upon opening.

Other than in adhesive-free or deadened areas, the first structure 10 and second structure 42 may be joined by PSA 20 or a permanent adhesive 34, between the structures, in all other areas.

The laminates made in accordance with the invention can be used for forming other types of packages as well. For instance, the laminate 75 could be utilized in a stand-up pouch, flat-bottom bag, fin/lap seal bag, easy peel film, pillow pouch, or any other package known in the art.

In an embodiment, one or more of the film layers of the invention may comprise a barrier layer or a sealant layer. The barrier layer may comprise any of various barrier materials including barrier polymer films such as: ethylene vinyl alcohol copolymer (EVOH), polyamide, and the like; metallized polyolefin films such as polyethylene, polypropylene, oriented polypropylene, and the like; AlOx-coated polymer films; SiOx-coated polymer films; metal foil; and others. The sealant layer may constitute the innermost surface of the laminate 75, and can comprise various sealant materials such as heat seals or cold seals. Heat seals generally are preferred because they provide stronger seals than cold seals typically are capable of achieving. Any suitable heat seal materials can be employed, such as polyethylene, polypropylene, ionomer resins such as SURLYN®, or others.

In an embodiment, the laminate 75 includes a metallization layer or a metal foil layer between the first structure 10 and the second structure 42, for example by providing a metallization layer on the surface of the layer that faces the first structure 10.

A method for making the packaging system of the invention is also provided, in an embodiment. The first structure 10 is advanced from a supply roll to an optional print station for printing graphics and/or indicia on the first structure by applying inks to a surface of the first structure 10. Optionally, prior to printing the first structure in the print station, the surface of the first structure that is subsequently laminated to the other structure may be treated by a corona discharge or flame treatment apparatus to render the surface more receptive to the inks and/or to render the surface more readily bondable to the pressure-sensitive adhesive that is subsequently applied to the surface as described below.

The first structure 10 may then be advanced to a first adhesive application station at which a PSA 20 is applied to the first structure in a predetermined pattern as described herein (or is flood-coated and deadened). The adhesive application station may comprise a gravure roll or any other application equipment known in the art. After application of the pressure-sensitive adhesive 20, the first structure 10 is advanced to a dryer such as an oven or the like, to dry the pressure-sensitive adhesive 20. In the case of the pressure-sensitive adhesive 20 being pattern-applied, the first structure 10 may then be advanced to a second adhesive application station at which a permanent laminating adhesive 34 is applied to the first structure 10 in such a manner that a sufficiently large proportion of the surface is covered by the permanent adhesive 34 to permit the first structure 10 to be adhesively attached to a second structure 42 at a downstream laminating station. Alternatively, the permanent adhesive 34 may be applied to the second structure 42 which may be adhesively attached to the first structure 10 downstream. In an embodiment, permanent adhesive 34 is applied in such a manner as to avoid the PSA 20 and adhesive-free regions 22, 23. Alternatively, the permanent adhesive 34 may be deadened in areas which will become the PSA region and the adhesive-free regions 22, 23. A suitable adhesive application device can be a gravure roll, for example. After the application of the permanent adhesive 34, the first structure 10 is advanced to a dryer such as an oven or the like.

The first structure 10 is then advanced to a laminating station comprising a pair of rolls forming a nip therebetween. The first structure 10 is passed through the nip along with a second structure 42 that is advanced from its own supply roll and the first and second structures 10, 42 are laminated to each other. The second structure 42 may be coextensive with the first structure 10—i.e., the width of the second structure 42 may be substantially equal to the width of the first structure 10 and the longitudinal edges of the second structure 42 substantially coincide with the longitudinal edges of the first structure 10. The resulting laminate 75 may then be advanced to a reel-up where it is wound into a roll for subsequent processing in the second phase of the manufacturing process as described below. Alternatively, it is possible for the reel-up operation to be omitted, such that the laminate 75 is directly advanced to the next phase.

The laminate 75 is advanced to a first scoring station at which a first, or outer, score line 52 is formed through the thickness of the first structure 10. Next, the laminate 75 is advanced to a second scoring station 60 at which a second, or inner, score line 62 is formed through the thickness of the second structure 42.

The scoring station can comprise a laser, die cutting machine, or any other manner of cutting or scoring known in the art. For instance, a kiss cut could be utilized. Additionally, it is within the scope of the invention to laser-score one side of the laminate 75 and to kiss cut or otherwise mechanically score the other side. This can be advantageous, for example, when one of the structures making up the laminate 75 is readily scored by a laser but the other structure is not. For instance, when the first structure 10 is a polyester such as PET, it can readily be scored with a laser, but if a polyethylene heat seal layer is employed on the opposite side, laser scoring may not be the best choice because polyethylene does not score well with a laser. In this case, kiss cutting or other mechanical scoring can be used to score the inner structure 42.

After the scoring operations, the laminate 75 can be sent to a reel-up and wound into a roll for subsequent processing. The laminate 75 can also be slit into a plurality of partial widths and wound into multiple rolls. In this latter instance, each partial width would have the recurring patterns of pressure-sensitive and permanent adhesives applied with suitably configured adhesive applicators to the full-width material, and would have the recurring score lines formed by suitably configured scoring devices acting on either the full-width laminate 75 prior to slitting or acting on each partial-width portion after slitting.

Many other modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. An ovenable lidding comprising:
an outer flexible structure having an outer cut line;
an inner flexible structure affixed to the outer flexible structure, the inner flexible structure having an inner cut line, wherein the inner cut line is offset from the outer cut line;
an adhesive layer which adheres the outer flexible structure to the inner flexible structure, wherein the adhesive layer comprises:
a channel of adhesive which surrounds both the outer cut line and the inner cut line, wherein the channel of adhesive defines a perimeter of at least one adhesive-free valve chamber within said channel, and wherein the valve chamber comprises at least a portion of the outer cut line and the inner cut line.

2. The ovenable lidding of claim 1 additionally comprising a sealant layer disposed on an inner surface of the inner flexible structure, wherein the sealant layer is capable of forming a heat seal.

3. The ovenable lidding of claim 2, wherein the sealant layer comprises polyethylene, polypropylene, or an ionomer resin.

4. The ovenable lidding of claim 1 additionally comprising a container body having at least one side wall and a flange extending from an upper edge of the at least one side wall, the inner flexible structure being attached to the flange to seal the package closed.

5. The ovenable lidding of claim 4 wherein the container flange comprises a sealant layer capable of forming a heat seal.

6. The ovenable lidding of claim 1, wherein the outer cut line defines a flap that is separable from the outer flexible structure along the outer cut line and the inner cut line defines an inner opening portion that is separable from the inner structure along the inner cut line.

7. The ovenable lidding of claim 1, wherein the inner cut line comprises an inlet valve from the interior of the package to the valve chamber.

8. The ovenable lidding of claim 1, wherein the outer cut line comprises an outlet valve from the valve chamber to the exterior of the container.

9. The ovenable lidding of claim 1 comprising two valve chambers.

10. The ovenable lidding of claim 1, wherein the inner cut line fluidly connects an interior of the packaging structure to the valve chamber and the at least one outer cut line fluidly connects the valve chamber to an ambient atmosphere surrounding the packaging structure.

11. The ovenable lidding of claim 1, wherein a gas flow channel is disposed between the inner cut line and the outer cut line.

12. The packaging structure of claim 1, additionally comprising an oil occupying the adhesive-free valve chamber.

13. The ovenable lidding of claim 1, wherein the outer cut line defines a flap that is separable from the outer flexible structure along the outer cut line and the inner cut line defines an inner opening portion that is separable from the inner structure along the inner cut line.

14. An ovenable lidding comprising:
an outer flexible structure having an outer cut line; and
an inner flexible structure affixed to the outer flexible structure, the inner flexible structure having an inner cut line, wherein the inner cut line is offset from the outer cut line, wherein the inner flexible structure is affixed to the outer flexible structure in a channel which surrounds both the outer cut line and the inner cut line, wherein the channel defines a perimeter of at least one valve chamber within said channel, and wherein the valve chamber comprises at least a portion of the outer cut line and the inner cut line.

15. A container sealed closed with the ovenable lidding of claim 14.

16. The ovenable lidding of claim 14 additionally comprising a sealant layer disposed on an inner surface of the inner flexible structure, wherein the sealant layer is capable of forming a heat seal.

17. The ovenable lidding of claim 16, wherein the sealant layer comprises polyethylene, polypropylene, polyester or an ionomer resin.

18. The ovenable lidding of claim 14 additionally comprising a container body having at least one side wall and a flange extending from an upper edge of the at least one side wall, the inner flexible structure being heat sealed to the flange to seal the package closed.

19. The ovenable lidding of claim 14, further comprising:
a vicious medium disposed within the at least one adhesive free area.

* * * * *